US010963127B2

(12) United States Patent
Howland et al.

(10) Patent No.: US 10,963,127 B2
(45) Date of Patent: Mar. 30, 2021

(54) SINGLE TAP CONTROL FOR ADDING AND MANAGING FAVORITES

(71) Applicant: salesforce.com, inc., San Francisco, CA (US)

(72) Inventors: Nicholas Howland, Kansas City, MO (US); Kyle Haskins, Novato, CA (US); Victor Nikolai Carunungan Oliveros, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 157 days.

(21) Appl. No.: 15/874,715

(22) Filed: Jan. 18, 2018

(65) Prior Publication Data

US 2019/0138163 A1 May 9, 2019

Related U.S. Application Data

(60) Provisional application No. 62/581,598, filed on Nov. 3, 2017.

(51) Int. Cl.
*G06F 3/0482* (2013.01)
*G06T 11/60* (2006.01)
*G06F 3/0481* (2013.01)
*G06F 3/0485* (2013.01)

(52) U.S. Cl.
CPC ............ *G06F 3/0482* (2013.01); *G06T 11/60* (2013.01); *G06F 3/0485* (2013.01); *G06F 3/04817* (2013.01)

(58) Field of Classification Search
CPC .. G06F 3/0482; G06F 3/0485; G06F 3/04817; G06T 11/60
See application file for complete search history.

(56) References Cited

U.S. PATENT DOCUMENTS

| 8,301,612 B2* | 10/2012 | Barker ................ G06F 21/6227 707/705 |
| 8,335,989 B2* | 12/2012 | Barraclough .......... G06Q 10/10 715/733 |
| 8,949,185 B2* | 2/2015 | Barker ................ G06F 21/6227 707/638 |
| 9,275,376 B2* | 3/2016 | Barraclough ........ G06Q 10/109 |
| 9,294,719 B2* | 3/2016 | Uhma .................... H04N 7/147 |
| 9,817,637 B2* | 11/2017 | Hersh ...................... G06F 7/78 |
| 9,900,297 B2* | 2/2018 | Krzanowski ............ G06F 21/33 |
| 2009/0307631 A1* | 12/2009 | Kim ...................... G06F 3/0416 715/830 |
| 2011/0099153 A1* | 4/2011 | Barraclough ........ G06Q 10/109 707/691 |
| 2011/0099189 A1* | 4/2011 | Barraclough ......... G06F 40/134 707/769 |

(Continued)

*Primary Examiner* — Maikhanh Nguyen
(74) *Attorney, Agent, or Firm* — Sterne, Kessler, Goldstein & Fox P.L.L.C.

(57) ABSTRACT

System, method, and computer product embodiments are described for populating and managing a polymorphic favorites list from a graphical user interface (GUI). The GUI provides an interface that allows a user to efficiently populate a favorites list and quickly access the favorites list via a global access point in a GUI, from anywhere in an application. The method enables the user to view objects in the favorites list, add objects to the favorites list, remove objects, and rearrange objects from the user's current application view as the user navigates across applications. The favorites list is configured to include a plurality of objects of a plurality of object types.

21 Claims, 17 Drawing Sheets

(56) References Cited

U.S. PATENT DOCUMENTS

| | | | |
|---|---|---|---|
| 2011/0099490 A1* | 4/2011 | Barraclough | G06Q 10/10 715/764 |
| 2011/0239158 A1* | 9/2011 | Barraclough | G06F 9/451 715/808 |
| 2011/0252314 A1* | 10/2011 | Barker | G06F 21/6227 715/255 |
| 2011/0276946 A1* | 11/2011 | Pletter | G06F 11/3688 717/124 |
| 2012/0185824 A1* | 7/2012 | Sadler | G06F 9/548 717/120 |
| 2012/0239619 A9* | 9/2012 | Hersh | G06F 7/78 707/628 |
| 2013/0036142 A1* | 2/2013 | Barker | G06F 21/6227 707/786 |
| 2013/0111337 A1* | 5/2013 | Deng | G06K 9/00248 715/255 |
| 2013/0246945 A1* | 9/2013 | Rose | G06F 3/048 715/760 |
| 2014/0032713 A1* | 1/2014 | Phan | H04L 67/06 709/217 |
| 2014/0222604 A1* | 8/2014 | Yellapragada | G06Q 30/0601 705/26.1 |
| 2015/0026597 A1* | 1/2015 | Gadamsetty | G06Q 50/01 715/753 |
| 2015/0026604 A1* | 1/2015 | Mulukuri | G06Q 50/01 715/758 |
| 2015/0033140 A1* | 1/2015 | Kuchoor | G06F 17/241 715/751 |
| 2015/0033148 A1* | 1/2015 | Kuchoor | G06F 17/241 715/753 |
| 2016/0011845 A1* | 1/2016 | Kuchoor | G06F 17/241 715/753 |

\* cited by examiner

SINGLE TAP CONTROL FOR ADDING AND MANAGING FAVORITES

CROSS-REFERENCE TO RELATED APPLICATIONS

This application claims the benefit of U.S. Provisional Patent Application No. 62/581,598, filed Nov. 3, 2017, entitled "Single Tap Control for Adding and Managing Favorites," the entirety of which is hereby incorporated by reference.

This application is related to U.S. Provisional Patent Application No. 62/581,440, filed Nov. 3, 2017, and U.S. Non-Provisional patent application Ser. No. 15/874,437, filed concurrently herewith on Jan. 18, 2018, now U.S. Pat. No. 10,437,614, both entitled "System and Method for Designating Multi-Object Favorites," the entirety of which is hereby incorporated by reference.

BACKGROUND

Software applications often provide user interface functionality that enables users to flag objects within the application as a "favorite." Particularly, a user may flag an object for storage in a personalized list to later access, view, and interact with the object in a more direct and efficient manner.

A favorites list enables users to quickly access information from a specific object. But, typical user interfaces have favorites lists that are monolithic in structure or implementation, and are limited to a uniform set of objects. A user must therefore normally manage multiple favorites lists across applications, delaying efficient access to a favorite object.

BRIEF DESCRIPTION OF THE DRAWINGS

The accompanying drawings are incorporated herein and form a part of the specification.

FIG. 7 also shows a control button allowing the user to remove the current object from the favorites list.

In the drawings, like reference numbers generally indicate identical or similar elements. Additionally, generally, the left-most digit(s) of a reference number identifies the drawing in which the reference number first appears.

DETAILED DESCRIPTION

Disclosed herein are methods, systems, and computer program products that enable a user to populate and view a favorites list via a control found globally within an application, in accordance with an embodiment. By way of non-limiting example, the control is a favorites icon positioned within a user interface of an application in a globally-accessible portion of the user interface.

The disclosure relates to an approach that allows a user to populate and view the same favorites list via a favorites access point, in the form of an icon accessible anywhere in a system of connected software applications and database views operating on and with compatible devices. The approach enables the user to add objects to the favorites list, remove objects, and rearrange objects as the user is navigating across applications and database views. The favorites list is unique to each user and is portable and synchronized for use across compatible devices and platforms. The key aspect of the disclosure is a global access point to the favorites list regardless of the current object view on the screen of the particular device, so that the user can efficiently store a plurality of favorites of different types and navigate back to them quickly.

Figure 15:
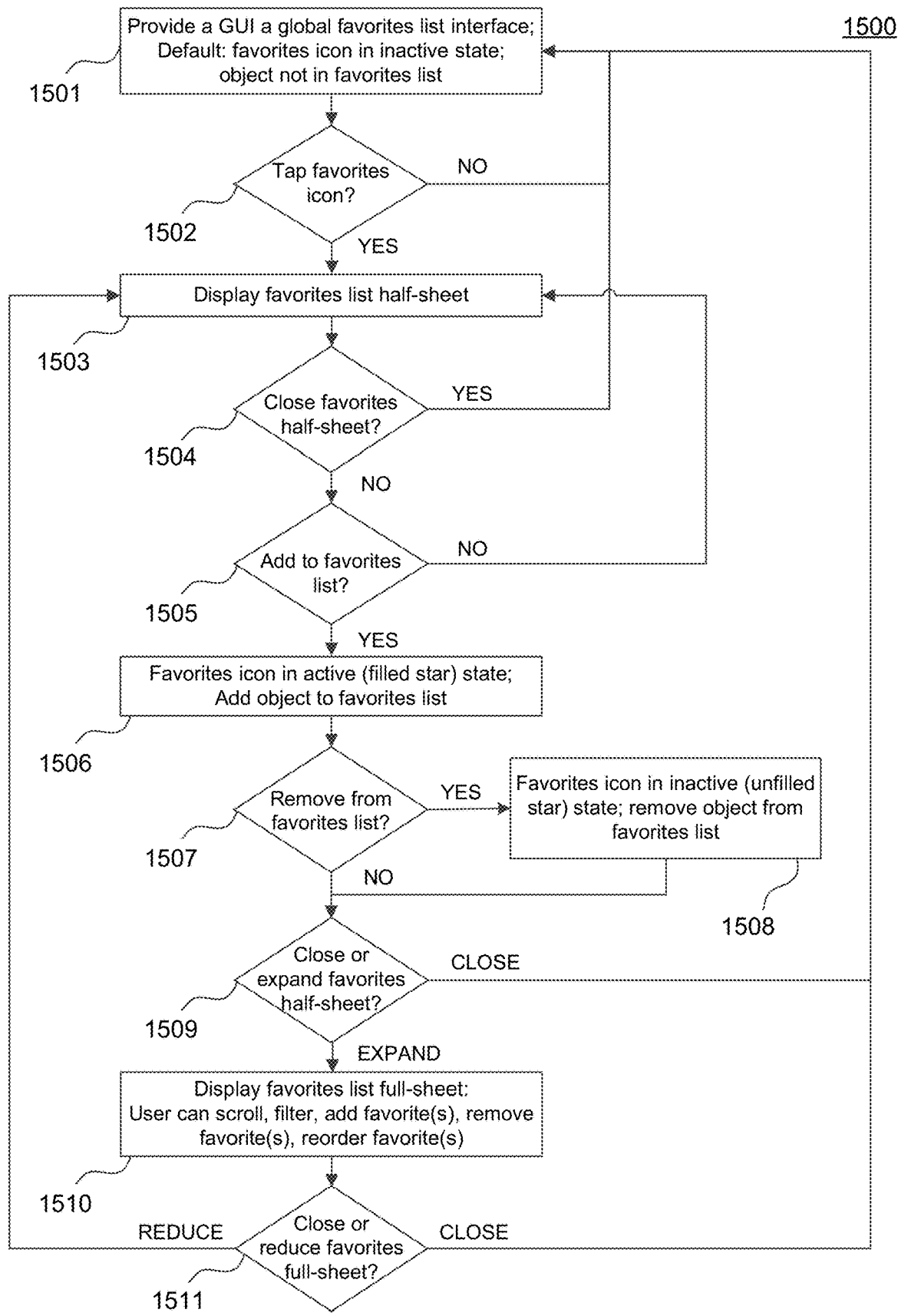
FIG. 15 shows a flowchart of the main aspects of the method disclosed herein.

FIG. 15 illustrates a flow chart of a method 1500, showing an embodiment of a combination of process steps to add, remove, and edit favorites in a favorites list, which are described in detail herein. The method 1500 is described with reference to FIGS. 3, 5, and 7, according to some embodiments of the steps, but method 1500 is not limited to those example embodiments.

It is to be appreciated that not all steps may be needed to perform the disclosure provided herein. Further, some of the steps may be performed simultaneously, or in a different order than shown in FIG. 15, as will be understood by a person of ordinary skill in the relevant art. Regardless of the performance or the order of performance of certain steps, the disclosure describes key features that are generally available to the user and applicable to many possible embodiments within a graphical user interface (GUI). These features include provision of a global favorites access point, a globally-accessible favorites list, a favorites icon that provides a visual status to the user for each potential and selected favorite (i.e., a favorites state), a favorites button that allows a user to add or remove a favorite with a single tap, a favorites list filtering function, a favorites list editing function, and an indication for any favorite that may be platform-specific.

As shown by the flow chart 1500 of FIG. 15, and described in detail herein, a user may, for example, see that an object within the GUI is not currently a favorite and tap the favorites icon to open the favorites list. Once in the favorites list, a user can close the favorites list without any further action, view the favorites list, add the current object to the favorites list with a single tap of the favorites button, remove a current favorite with a single tap of the favorites button, expand the favorites list to a larger view (and later reduce the view size), filter the favorites list, edit the order of the favorites list, and remove multiple favorites at one time. Each function is easy for the user to access from anywhere in an application, each step is easy to implement, usually by one simple tap or swipe, and user feedback is quick and efficient.

Favorites Access Point

The method is described in detail herein from a default starting point of a GUI with enabled favorites functionality, an empty favorites list, and the current object specifically not in the favorites list, i.e., with a GUI header having an inactive favorites icon, according to flow chart state 1501. The method allows a user to access the favorites list and an "Add to Favorites" button from the favorites access point icon, a star icon 101 shown in the exemplary embodiment of FIG. 1A, within the application header 102. The header 102 is global to each application page and is located, in the exemplary embodiment of FIG. 1A, at the top of a mobile device 100 screen.

Figure 1A:
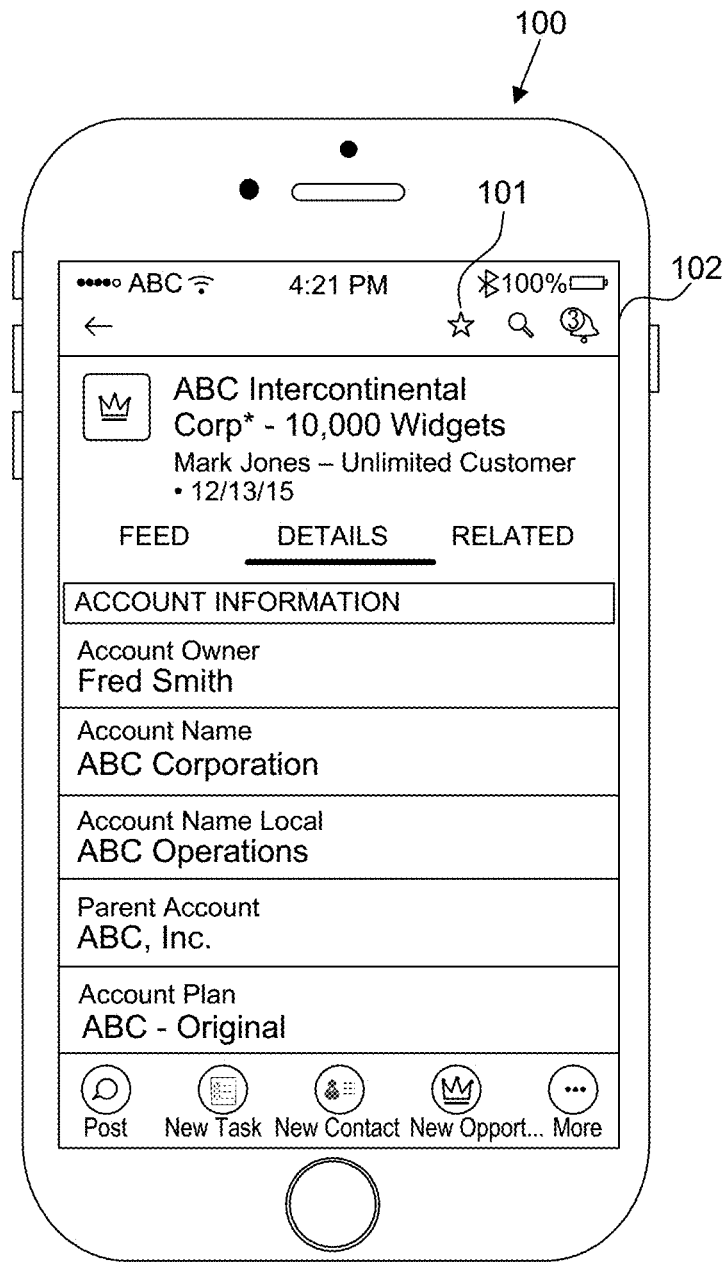
FIGS. 1A-1C show example views of an application page on a mobile device with various states of a favorites access point in a global header, in accordance with embodiments.
Figure 1B:
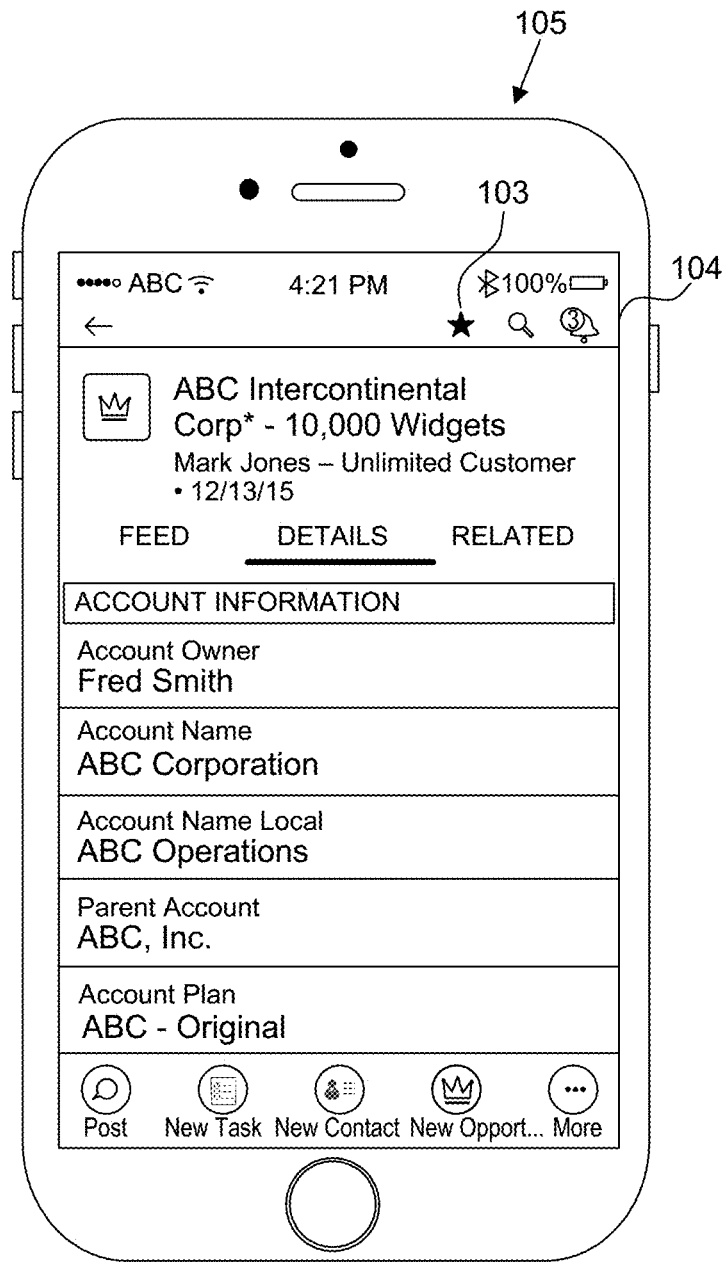
Figure 1C:
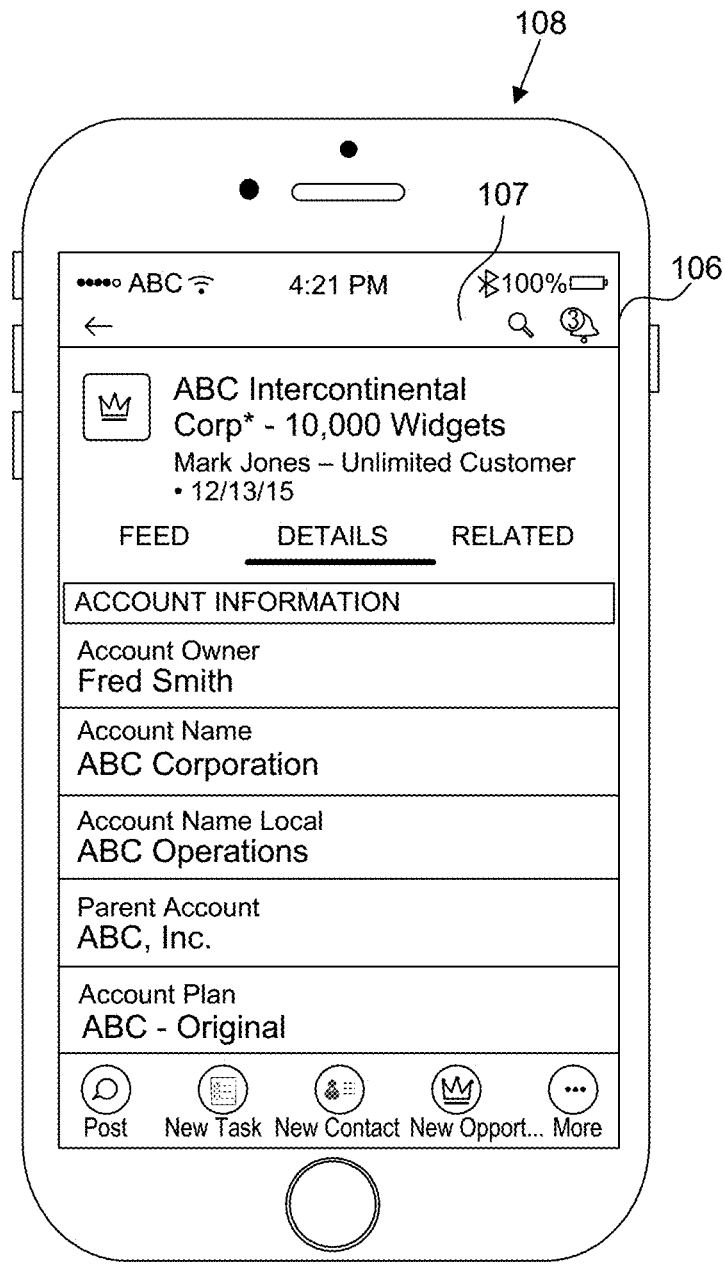

The inactive state of the favorites access point icon is the unfavorited state, which is an outlined (empty) star icon 101 in the exemplary embodiment of FIG. 1A. The active state of the favorites icon replaces the outlined star with a solidly filled star 103 in the global header 104 of the mobile device 105, as shown in the exemplary embodiment of FIG. 1B. The appearance of the favorites icon allows users to immediately recognize that an object is already added to the favorites list. A global header 106 that does not include a favorites star icon 107 shows the favorites access point as disabled for that object on the mobile device 108, as shown in the exemplary embodiment of FIG. 1C. A missing star icon indicates that, for example, the favorites functionality has not been enabled by a system administrator for the particular object in view on the screen, or the favorites functionality is incompatible with the current object or device.

Favorites List

A favorites list comprises a collection of different or diverse types of objects as applicable to each application for which an object may be favorited. A list consisting of different or diverse types of objects is defined herein as "polymorphic." Regardless of the types of objects in the list or currently on the device screen, all objects may be generically referred to herein as "items." For example, in the exemplary embodiment, titles on control buttons use the word "item" to mean "object."

The objects, or items, may refer to entities, such as users, tenants, accounts, contacts, leads, opportunities, reports, cases, files, documents, orders, price books, products, solutions, forecasts, or any other definable category. Objects, or items, may also refer to instances of the entities, such as the data for individual users, tenants, accounts, contacts, leads, opportunities, reports, cases, etc. Objects, or items, may also refer to tables that include fields or a schema describing the entities. For example, a table may define fields for customer contacts, such as name, address, phone number, fax number, etc. The same or another table may define fields for purchase orders such as customer, product, sale price, date, etc. Objects, or items, may also refer to records that contain data or instances for the entities and fields. For example, a record may contain the specific name, address, phone number, fax number, etc., for a particular customer contact. A record may also contain the specific customer, product, sale price, and date for a particular purchase order. As a user navigates applications, an object, or item, in the favorites list may simply be the page view of an application, including its screen arrangement and content. A person of ordinary skill in the relevant art will appreciate that a user's favorites list could be populated with numerous other types of objects for efficient access to a myriad of information types.

Favorites Button States

Figure 2:
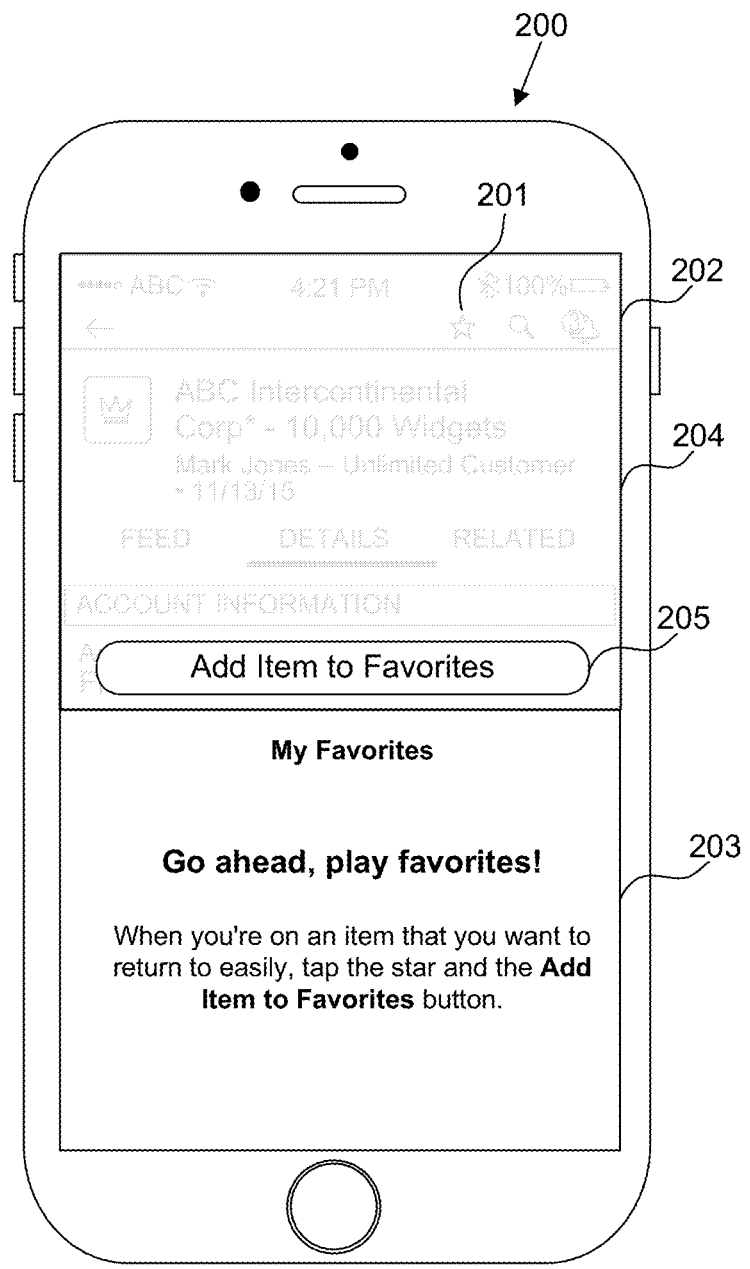
FIG. 2 shows an example view of an application page on a mobile device with an overlaid empty half-sheet favorites list, in accordance with embodiments.

To allow the user to access any and all favorites, regardless of object type, in a single place within a GUI, a single-tap control is disclosed. Specifically, the favorites icon can be tapped by the user to display the "My Favorites" half-sheet 203 overlaid on a masked current object 204, as shown in the exemplary embodiment of FIG. 2, and as illustrated by the decision step 1502 and state 1503 of the flow chart of FIG. 15. If no objects have been added to the favorites list, the half-sheet 203 will be in an empty state and an inactive favorites icon 201 will be in the global header 202. Once the half-sheet 203 appears, a control button 205 titled "Add Item to Favorites" also appears above the half-sheet 203, allowing the user to add the current object to the favorites list. The empty state may consist of a title and descriptor text, for example, to invite the user to populate the "My Favorites" list. No edit functionality is required for an empty favorites list, so no edit control button, as discussed later, is shown in the "My Favorites" half-sheet header. To close the half-sheet 203, before or after adding a favorite (see decision steps 1504, 1509 of FIG. 15), the embodiment allows the user to swipe down on the half-sheet 203 or tap anywhere above 202, 204 the half-sheet list 203 and header 205.

Figure 3:
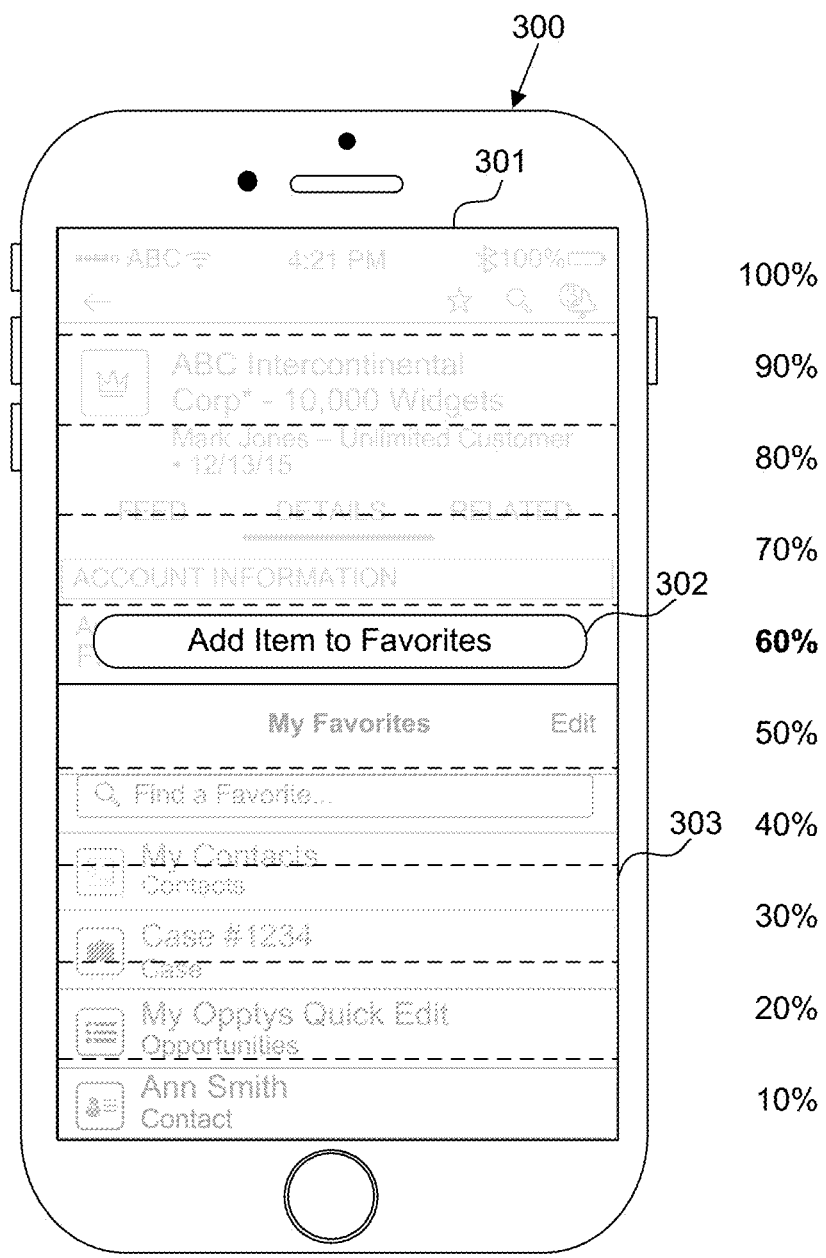
FIG. 3 shows an example sizing of a half-sheet favorites list view, in accordance with embodiments.

As illustrated in FIG. 3, the half-sheet 303 is defined by a standard gradient used regardless of the size of screen of the particular device 300 in use. For example, in a preferred embodiment, by dividing the entire screen 301 vertically in equal 10% sections, a half-sheet 303 will take up the lower five sections, or 50%, of a mobile device's screen. A control button 302 is located above the half-sheet 303 in the sixth section, for a total of 60% coverage of the device's screen. A person of ordinary skill in the relevant art will appreciate that a favorites sheet could be configured to be of various percentages of size of the device screen while still allowing the user to view the masked object beneath the favorites sheet.

Figure 4:
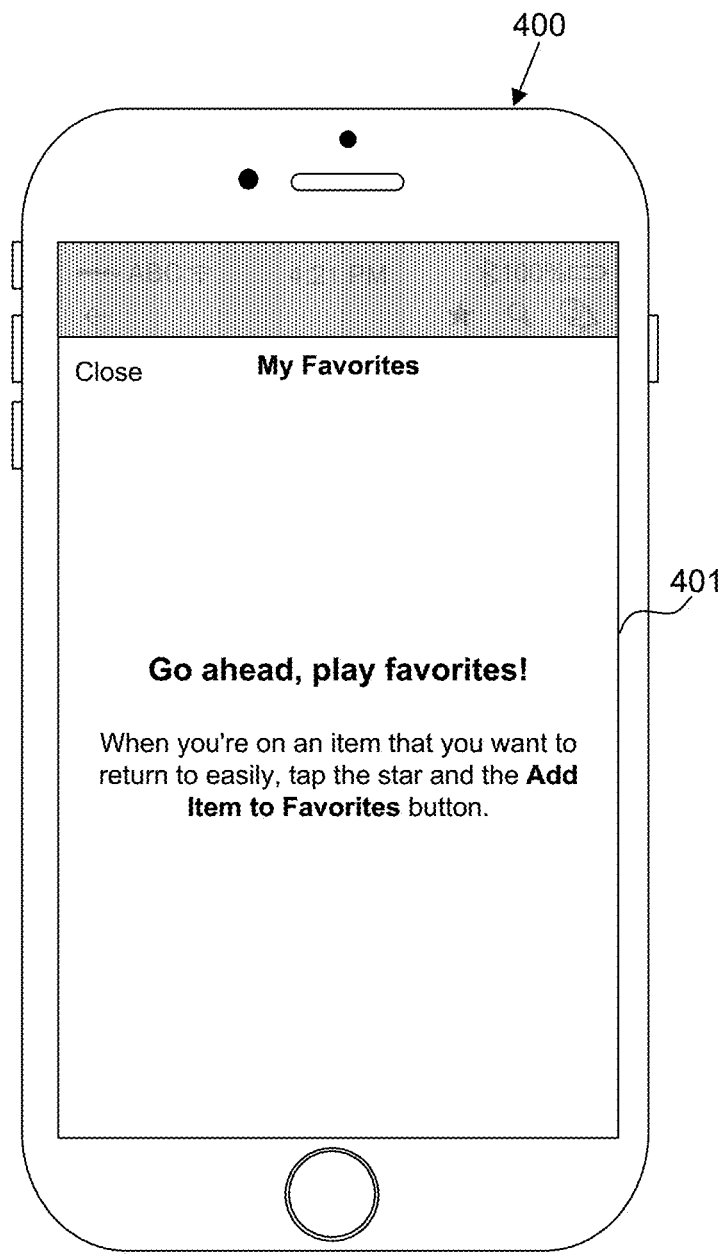
FIG. 4 shows an example view of an application page on a mobile device with an empty full-sheet favorites list, in accordance with embodiments.

The method allows a user to swipe up on the "My Favorites" half-sheet of FIG. 3 to expand the half-sheet list space to a full sheet 401, thus taking up about 90% of the device's 400 screen, as illustrated in the exemplary embodiment of FIG. 4. Similarly to the half-sheet empty state, an empty full sheet 401 may contain a title and descriptor text, for example, to invite the user to populate the "My Favorites" list. Similarly also, when the full sheet 401 is empty, no edit control button will be shown in the "My Favorites" full-sheet header, because there are no objects in the favorites list to edit. A filter control, as discussed later, does not appear in the header either when there is an empty full-sheet favorites list, because there are no objects in the favorites list upon which to filter.

Figure 5:
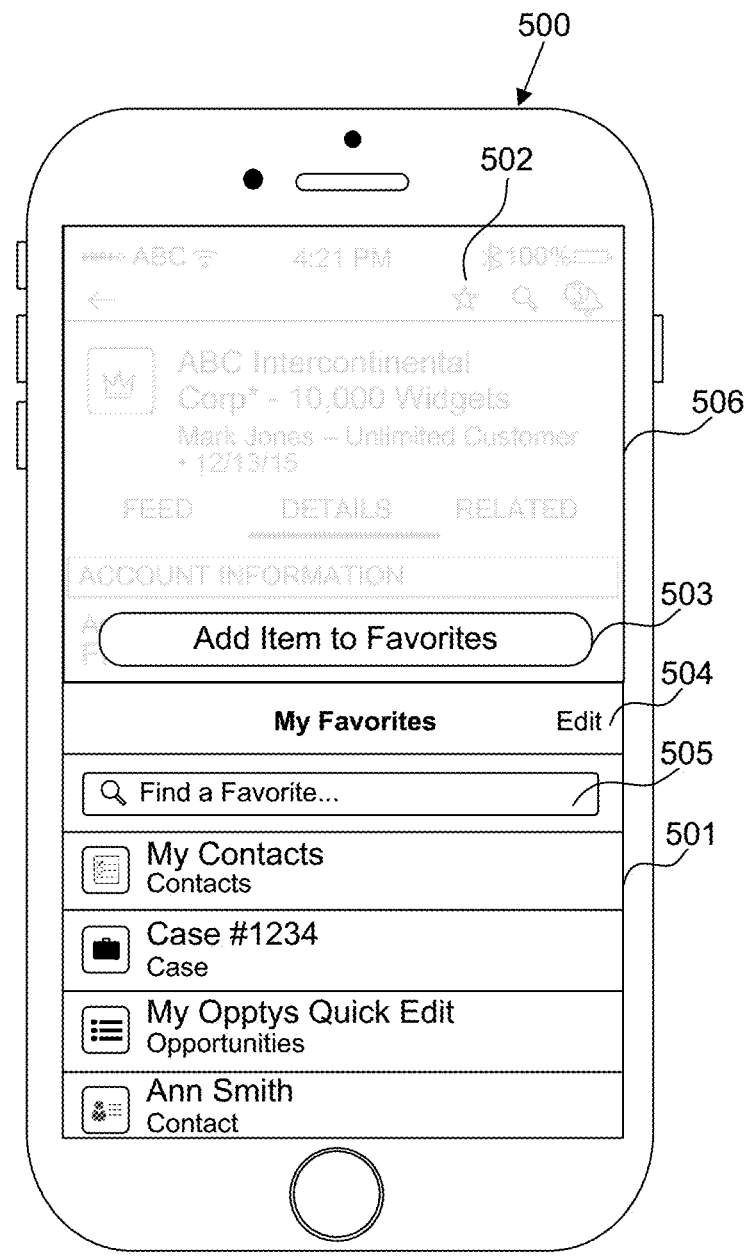
FIG. 5 shows an example view of an application page on a mobile device with a populated half-sheet favorites list and a control button allowing the user to add the current object to the favorites list.

FIG. 5 shows an exemplary embodiment of an application page (i.e., the current object) on a mobile device 500 with a populated favorites list of polymorphic items 501, shown in half-sheet view. The half-sheet will appear when the user first taps the favorites star icon control 502, regardless of whether the favorites list is empty or populated with favorites. Once the half-sheet appears, if the current object is not yet a favorite, a control button 503 titled "Add Item to Favorites" allows the user to add the current object to the favorites list with a single tap. See decision step 1505 of FIG. 15. Tapping the "Add Item to Favorites" button 503 will trigger the following steps in the exemplary embodiment:

1. The "Add Item to Favorites" button 503 will transition to the active state, which changes the background color of the button and changes the button text to "Remove Item from Favorites." (See FIG. 7.)
2. The favorites star icon within the header of the object screen underlying the favorites list becomes active (filled). (See FIG. 7, 702 and FIG. 15, 1506.)
3. The item is added to the bottom of the favorites list. (See FIG. 7, 703 and FIG. 15, 1506.)

FIG. 5 also shows an edit control button 504 over the half-sheet favorites list 501. The edit control button 504 will only exist when there are favorites in the favorites list 501. Tapping the edit control button 504 causes the half-sheet to expand to a full-sheet favorites list. The half-sheet 501 also contains a text-based action for editing the list, embodied as a filter input 505 for filtering through the list, causing the half-sheet to expand to full-sheet view. As a limitation of the exemplary embodiment, editing and filtering, as well as scrolling, of the favorites list can be performed by the user only in full-sheet view. See FIG. 15, decision step 1509 and block 1510.

Also shown in the exemplary embodiment of FIG. 5 is the masking function of the embodiment. When a user taps the favorites icon 502 within the app header, a mask (appearing as a darkened, but transparent gradient) 506 will cover the screen (thus the current object), and the half-sheet 501 will slide up from the bottom of the screen. The key purpose of the mask is to indicate to the user the current object that is on the screen, so that the user can be certain of what object is being added to the favorites list when the user taps "Add Item to Favorites" 503. The mask feature also assists the user's orientation during the navigation process, before the user taps within the favorites list to another object's location within the system of applications and databases. Within the favorites list, the user can either tap an item in the list to navigate to it or swipe up to view the full-sheet list. A user can swipe up from anywhere within the half-sheet list to expand to the full sheet, represented by the decision step 1509 in the flow chart of FIG. 15. Note that when the half-sheet list expands to the full sheet, the "Add Item to Favorites" button 503 goes away, as the current object behind the favorites list is no longer within view of the user. The user would thus not have visual context of which object to add as a favorites item.

Figure 6:
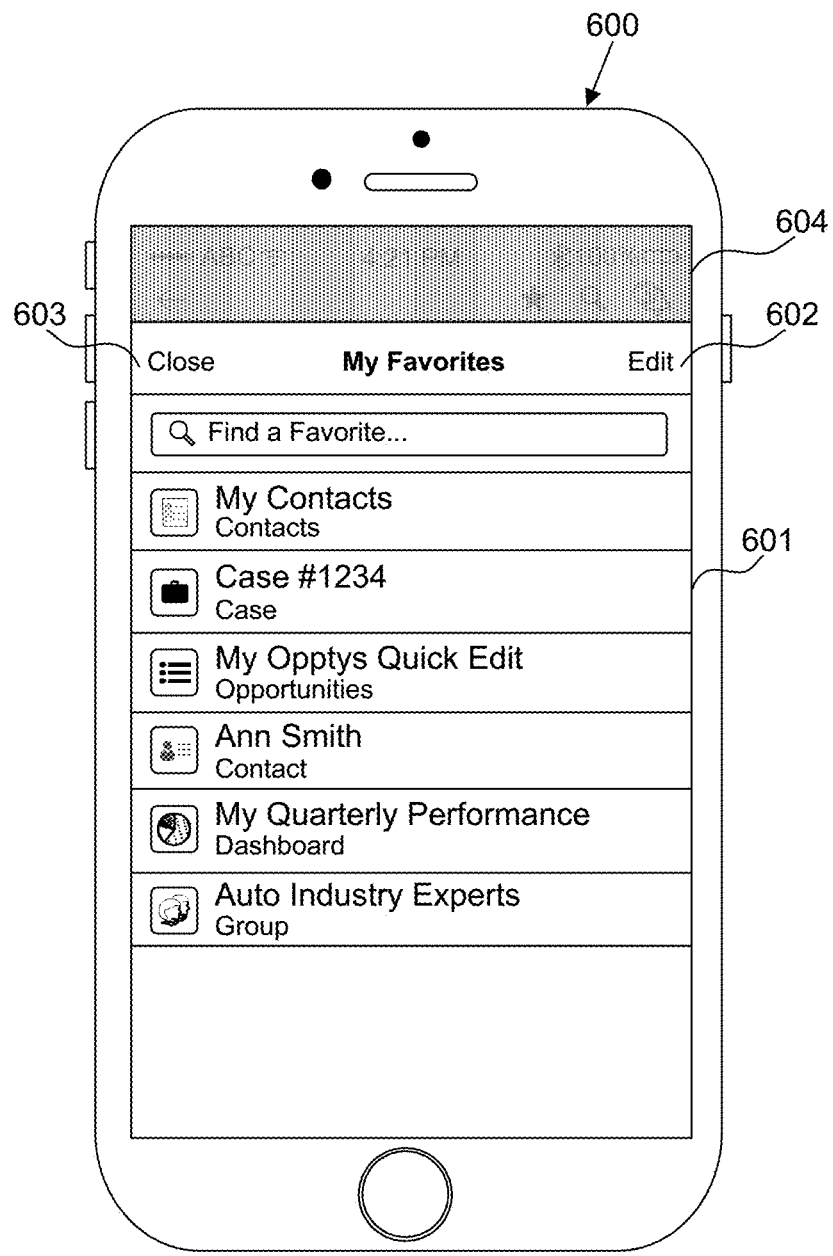
FIG. 6 shows an example view of an application page on a mobile device with a populated full-sheet favorites list and control buttons.

FIG. 6 shows an exemplary embodiment of an application page on a mobile device 600 with a populated favorites list of polymorphic items 601, shown in full-sheet view. In the exemplary embodiment, when the user swipes up from anywhere within the half-sheet list of FIG. 5, the favorites list takes over most of the screen, resting slightly under the location of the global header 604. The mask will darken even more to about 75% opacity, in the exemplary embodiment, essentially hiding the contents of the global header 604 until the user closes the full-sheet favorites list by tapping the close control button 603. See the flow chart of FIG. 15, decision step 1511. When the full sheet is open, the user may edit the full-sheet favorites list by tapping the edit control button 602. The user may also scroll the full-sheet list, which is particularly helpful if the list contains more items than can be shown on one device screen. In the exemplary embodiment, a user's favorites list may contain up to 200 favorites, although a person of ordinary skill in the relevant art will appreciate that a favorites list could hold any maximum number of favorites, dependent, for example, on the data storage limits of a computing system.

In the exemplary embodiment, each item in the favorites list is generally listed with a title of the item, and a second line of metadata depicts the type or source of the item. For preferred viewing on a mobile device, the title and additional metadata are each allowed one row, and their text may be truncated if they are longer than the allowable width of the screen area. A person of ordinary skill in the relevant art could envision a number of other variations for displaying and describing the objects in the favorites list. Note that if a user reduces the full-sheet view of the favorites list to the half-sheet view by swiping down anywhere within the full-sheet list (see FIG. 15, 1511), the preferred embodiment will still contain the title and metadata for the viewable objects in the list.

Figure 7:
FIG. 7 shows an example view of an application page on a mobile device with a populated half-sheet favorites list, where the current object has been added as a favorite and a user notification confirms the addition.

FIG. 7 shows an exemplary embodiment of an application page on a mobile device 700 with a populated favorites list of polymorphic items 701, shown in half-sheet view, where the current object has been added as a favorite (indicated by a filled star icon 702) and a toast 703 confirms the addition. A "toast" is defined as a pop-up notification, located in the exemplary embodiment at the bottom of the "My Favorites" page, to the user so that the user can confirm that an object was added to the favorites list. In the exemplary embodiment, the newly added favorite is added to the bottom of the list, similarly to, for example, the addition of a bookmark to a list of bookmarks. The user may check the addition again by tapping the edit control button 705 and scrolling to the bottom of the list. A person of ordinary skill in the relevant art will appreciate that, in another embodiment, a newly added favorite may be added to the top of the list, which would not require the user to perform additional scrolling in order to view the newly added favorite in a list that is longer than the current view size.

Also shown in FIG. 7, a control button 704 titled "Remove Item from Favorites" allows the user to remove the current object from the favorites list with a single tap. See decision step 1507 of FIG. 15. Tapping the "Remove Item from Favorites" button 704 will trigger the following steps in the exemplary embodiment:

1. The "Remove Item from Favorites" button 704 will transition to the active state, which changes the background color of the button and changes the button text to "Add Item to Favorites," as in FIG. 5, 503.
2. The favorites star icon within the header of the object screen underlying the favorites list becomes inactive (unfilled and outlined). (See FIG. 5, 502 and FIG. 15, 1508.)
3. The item is removed from the bottom of the favorites list. (See FIG. 15, 1508.) A toast will similarly confirm that the current object was removed from the favorites list.

Figure 8:
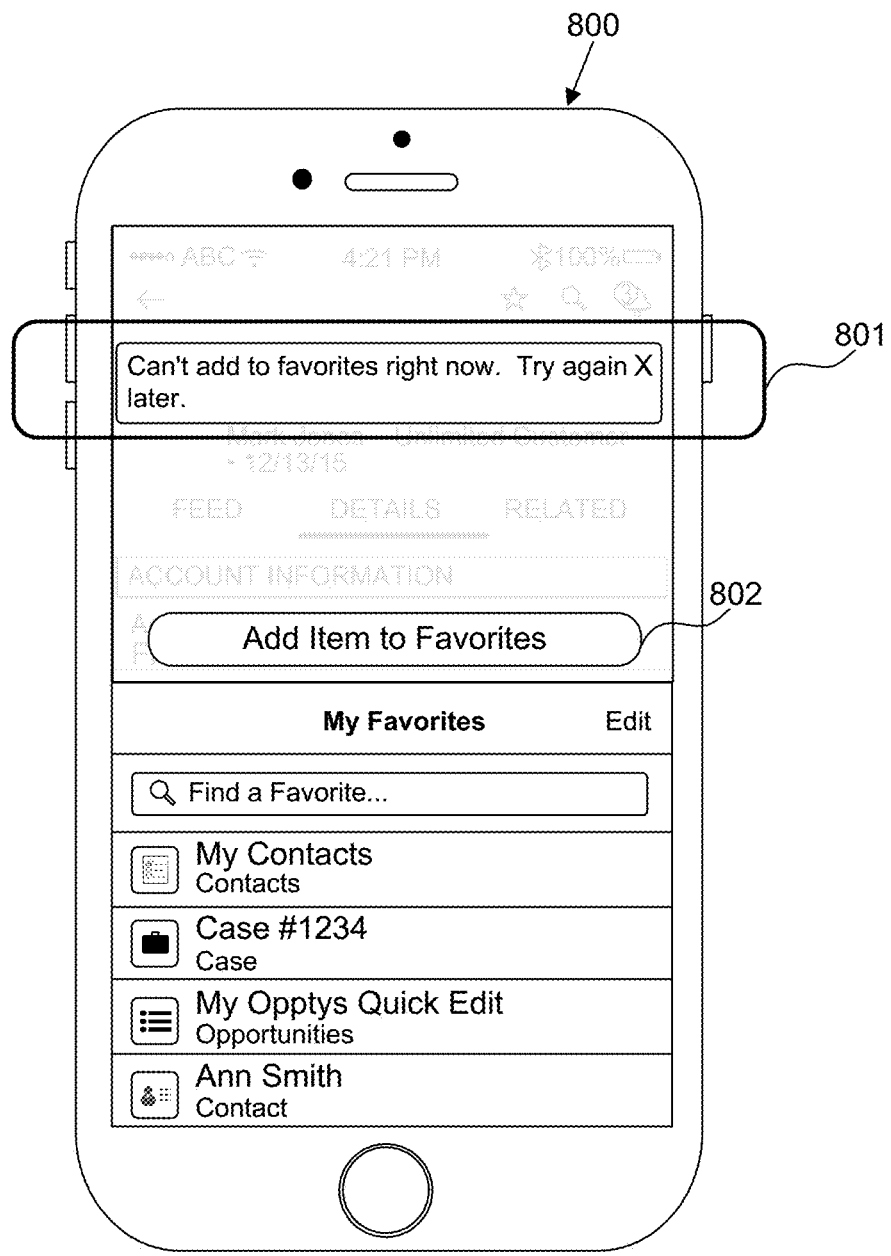
FIG. 8 shows an example of a toast appearing at the top of the mobile device screen when a user taps the "Add Item to Favorites" control button but the item (i.e., object) cannot be added.

FIG. 8 illustrates an example of a toast 801 appearing at the top of the mobile device 800 screen when a user taps the "Add Item to Favorites" control button 802 but the item cannot be added. Reasons why the item may not be able to be added include, for example, a server error has occurred, or the system administrator has disabled a part of the functionality needed to implement the favorites list on a specific device or for a specific group of users. A toast may also appear when an item cannot be removed from the favorites list for similar reasons. A person of ordinary skill in the relevant art will appreciate that there could be a myriad of reasons to use such a toast to notify the user.

Favorites List Filtering

Figure 9:
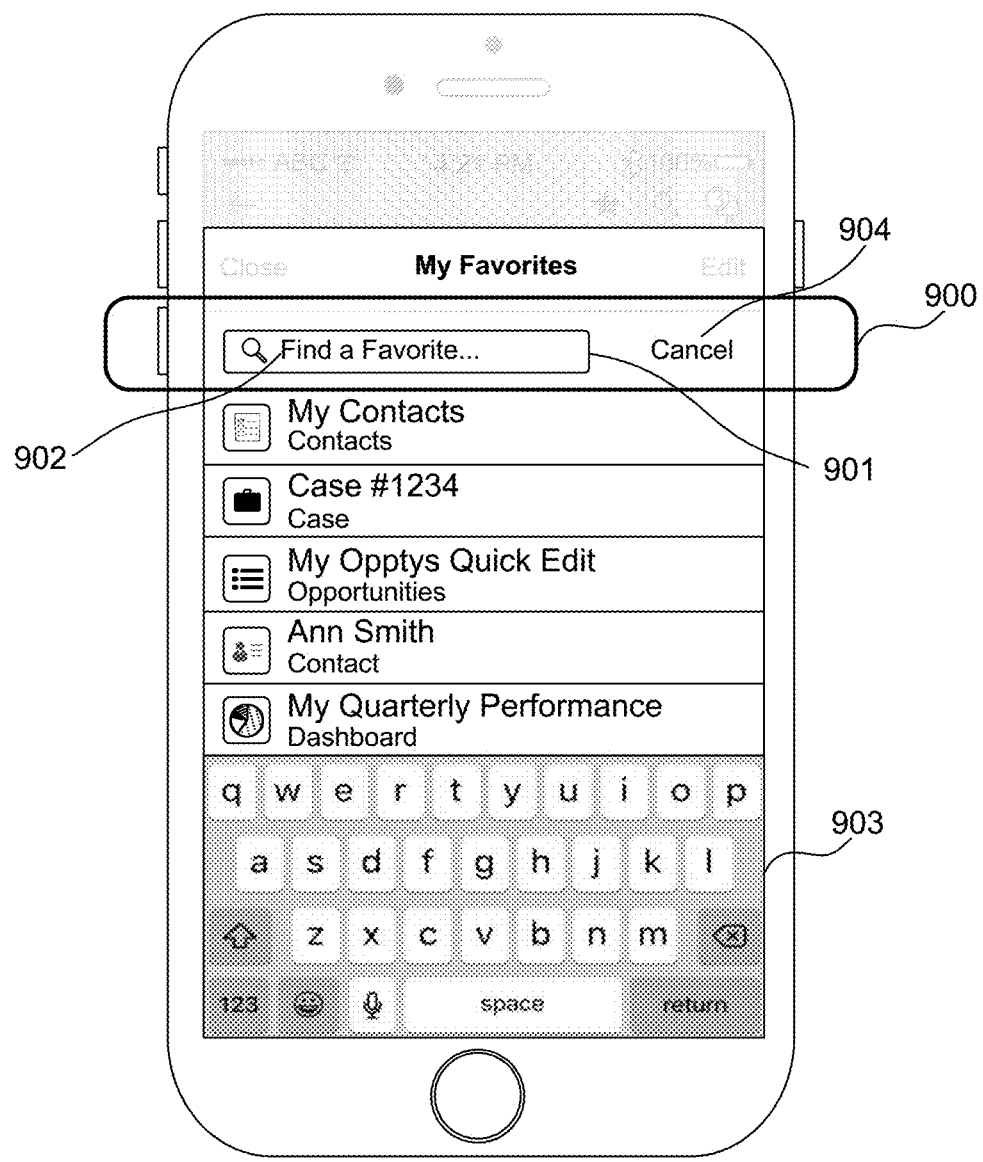
FIG. 9 shows an example view of an application page on a mobile device with a filtering function activated for a favorites list.

For longer favorites lists, a filtering function in full-sheet view is beneficial to the user as a way to search for a favorited object using text-based search functionality. In the exemplary embodiment, filtering can be initiated from both the half-sheet and full-sheet favorites list views. In the half-sheet view (see FIG. 5), the inactive state of filtering shows the filter input box with a gray border around it and the ghost text "Find a Favorite . . . " 505. As illustrated in FIG. 9, when a user taps into the filter input box, the half-sheet expands to a full sheet and the text input functionality 900 becomes operable. The outline of the filter input box then changes color to indicate that it is active (using a different color, such as blue, in the exemplary embodiment 901), the cursor is placed in front of the ghost text 902, and a keyboard slides up from the bottom of the screen to enable the user to input text 903. As the filter input becomes active, the edit and close buttons within the sheet header become disabled.

As the user begins typing, the favorites list immediately filters out the results not matching the user's query, leaving the user only with options that match the characters typed. If no results can be found in the favorites list that match the user's query, an empty state screen is shown with descriptor text indicating no results. In the exemplary embodiment, after the first character is typed, a clear button (embodied as an "x") appears within the far right side of the filter input 904. A "Cancel" button also appears to the right of the input field 904. Tapping the cancel button closes the keyboard and cancels the filtering action without any change of state to the favorites list.

Favorites List Editing

The exemplary embodiment allows a user to edit the favorites list on a mobile device to personalize the ordering of the items within the list, adding further efficiency to the user's particular interface. A user's favorites list, in its personalized order, is also portable across devices. A person of ordinary skill in the relevant art will appreciate that the implementation of the favorites list may be on a smartphone, tablet, personal digital assistant (PDA), or similar mobile device, as well as on desktop computers and the like. The order of the favorite items on the mobile device is synchronized with the order of the favorite items on a desktop computer, for example, regardless of the object type of the items.

Figure 10:
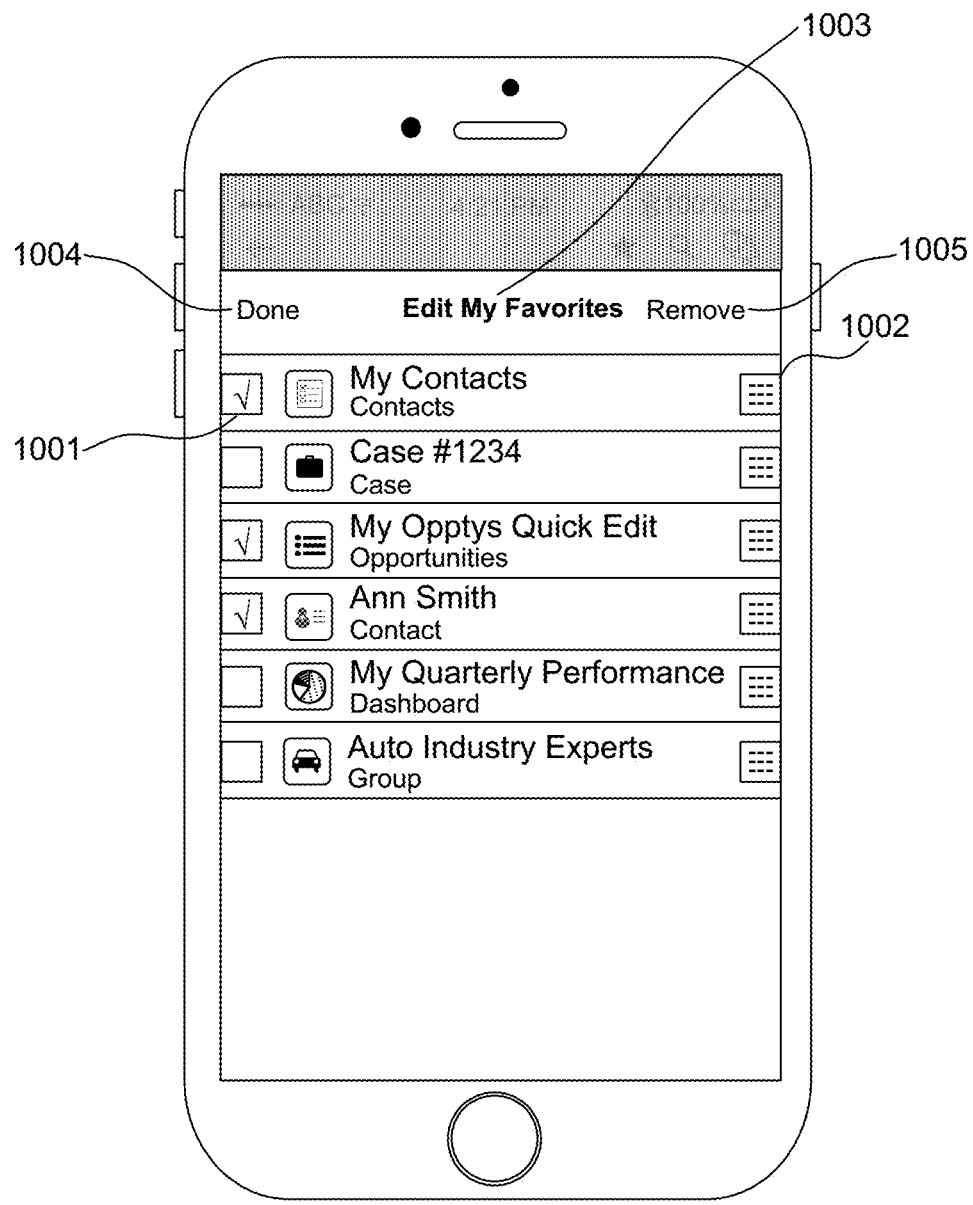
FIG. 10 shows an example view of an application page on a mobile device with an editing function activated for a favorites list.

The exemplary embodiment allows the user to enter the edit mode when in the full-sheet view of the "My Favorites" page by either tapping the edit button in the top right corner of the header or long-pressing on a row within the favorites list. (See FIG. 6.) As illustrated in the exemplary embodiment of FIG. 10, after a user taps the edit button, the favorites list slides over to the left as a column of check boxes 1001 appears. At the same time, a grabber icon 1002 appears to the right of each row, which allows the user to long press and reorder the list by dragging each item into its desired place. The header also transitions to have the text "Edit My Favorites" 1003. Additionally, the header includes a "Done" button 1004 to exit or cancel the editing action. Note that the user can also enter the edit mode when in the half-sheet view of the "My Favorites" page by tapping the edit button, which first expands the favorites list to the full-sheet view before activating the other transitions described in this paragraph.

Figure 11:
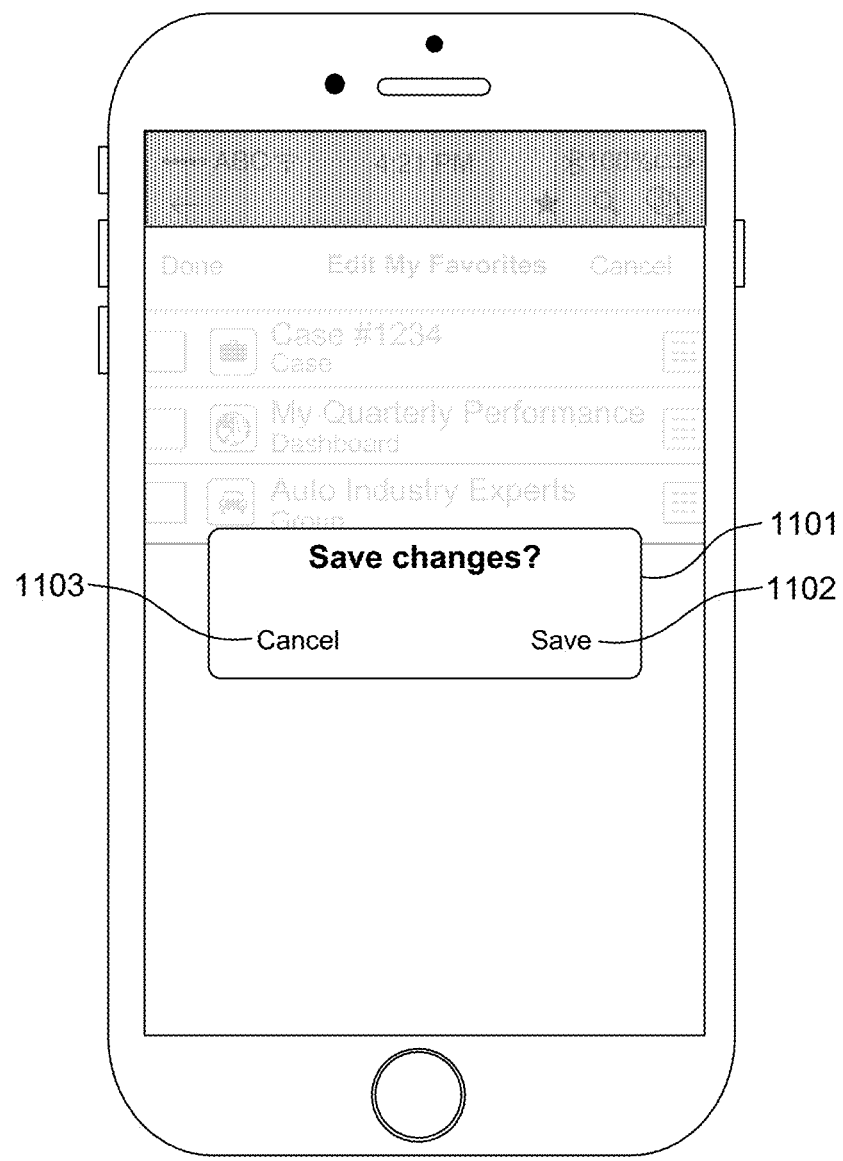
FIG. 11 shows an example view of an application page on a mobile device with a confirmation dialog following user edits to the favorites list.

While in edit mode, the exemplary embodiment allows a user to remove one or more items from the favorites list at one time by tapping to select a check box in each row of the item(s) 1001 that the user desires to remove. Once at least one check box is selected, the "Remove" button 1005 becomes active and the user may remove the selected items by tapping the button. Once the user is satisfied with the edits, the user may tap the "Done" button, which activates a "Save Changes?" dialog box 1101, as shown in FIG. 11, for user confirmation of the changes. If no changes are made, no dialog box appears. If the user confirms the changes by tapping the "Save" button 1102, the items are permanently removed. The "Cancel" button 1103 exits out of the dialog and returns the user to the in-progress edit screen.

Platform-Specific Items

Figure 12:
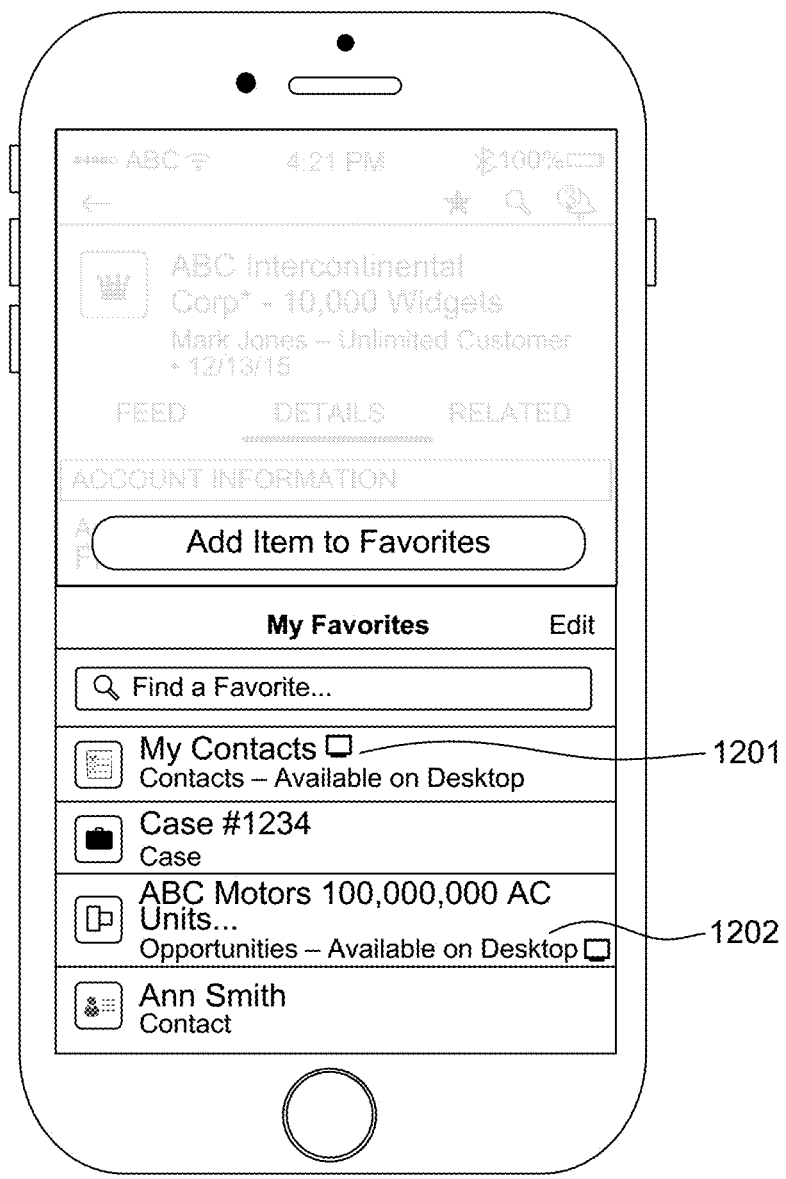
FIG. 12 shows an example view of an application page on a mobile device with special icons identifying platform-specific objects in the favorites list.
Figure 13:
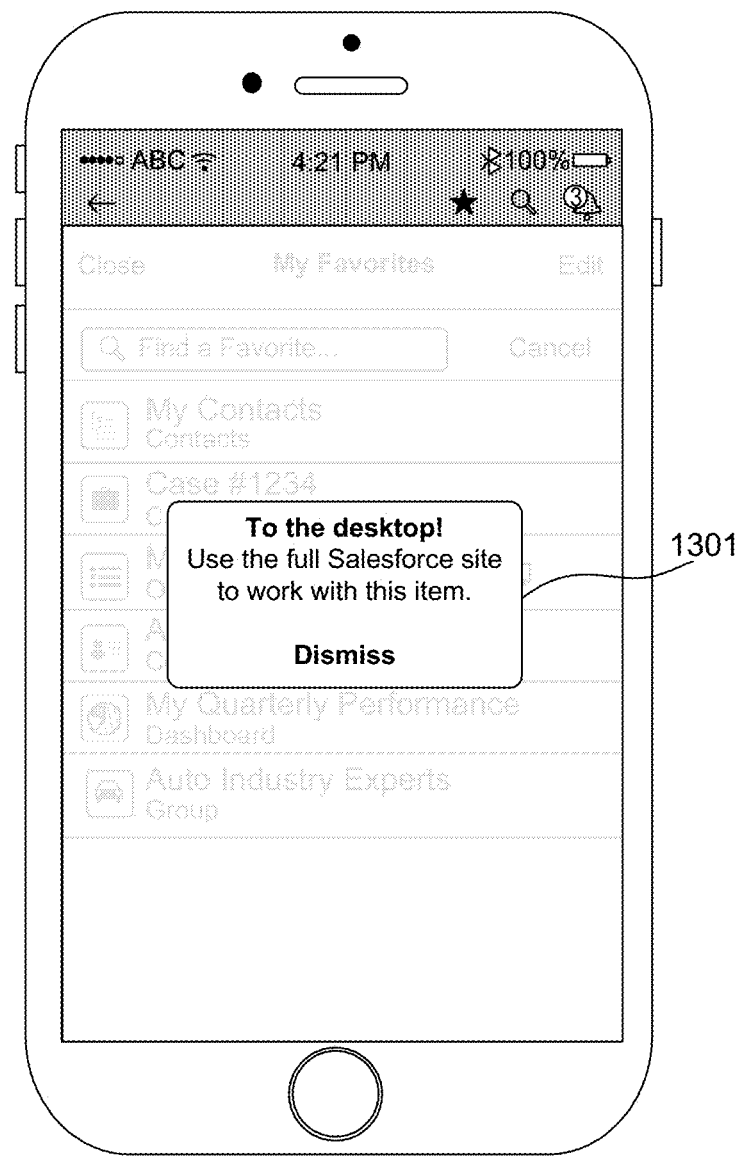
FIG. 13 shows an example view of an application page on a mobile device with a pop-up notification identifying for the user the platform configured to access a platform-specific favorite.

It is possible that not all objects can be added to the favorites list when running the method on every computing device or platform. In the exemplary embodiment of FIG. 12, when an object can only be opened on a specific platform, the favorites list, either in half-sheet or full-sheet view, will indicate that an object is platform-specific by a special icon next to the title of the object in the list 1201. Note that the favorited item will still be in the list if it had already been added to the list on a compatible platform. The special icon will be provided as a desktop icon for desktop-specific objects and as a mobile icon for mobile-specific objects, for example. The second line of metadata descriptive text 1202 in the list will indicate where the object can be viewed. Additionally, if a user taps on an item in the list that can only be opened on another platform, a dialog 1301, as exemplified in FIG. 13, will pop up to provide further information to the user, directing the user to use the necessary platform to view the platform-specific object. In the preferred embodiment, a platform icon is only shown for objects that are compatible with a platform other than the current platform. For example, the favorites list on a mobile device may show only desktop-specific icons, and, from this, the user may infer that an object without a platform-specific icon is compatible with at least the current platform.

Computer System Implementation

Figure 14:
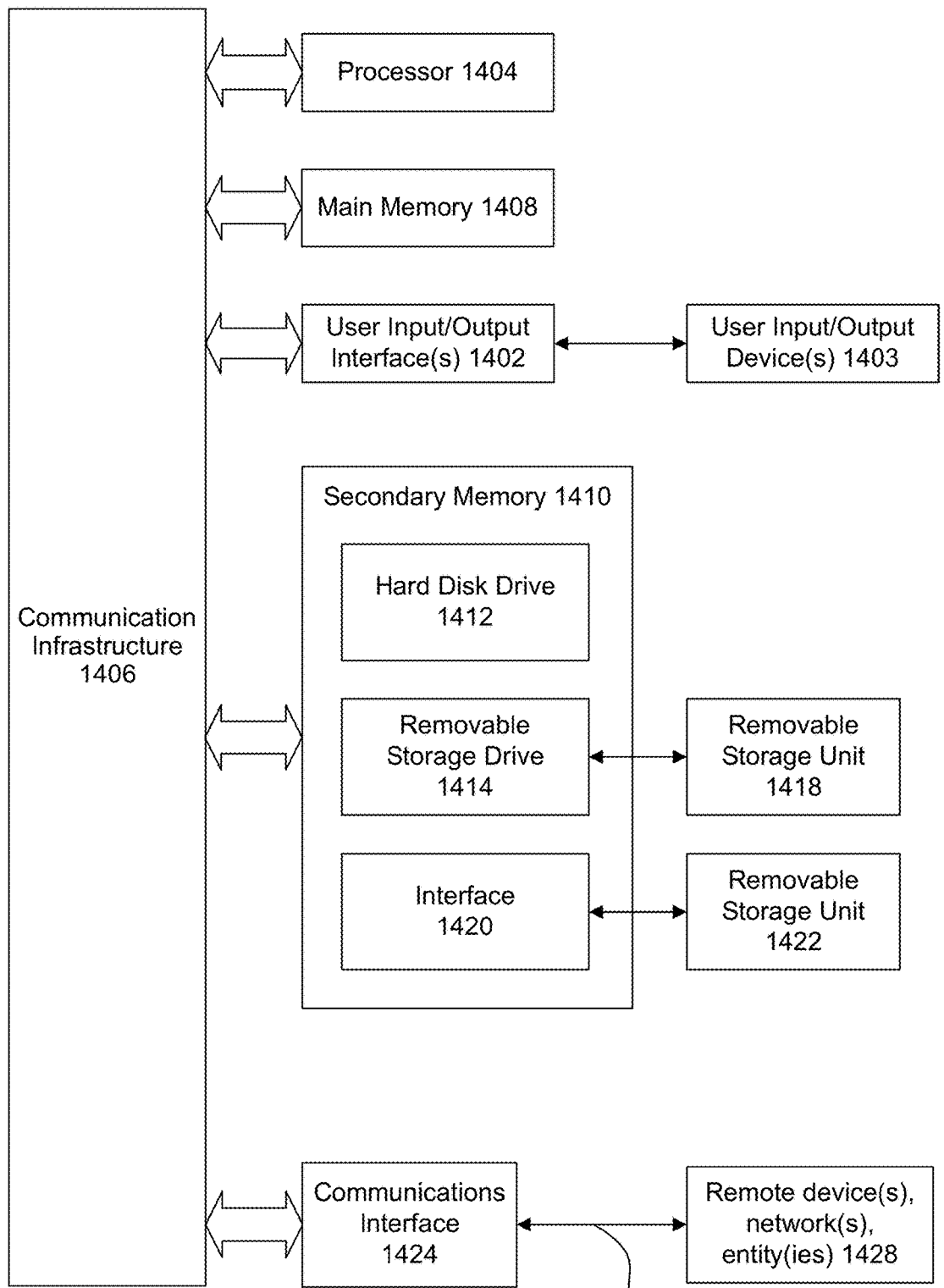
FIG. 14 is an example computer system useful for implementing various embodiments.

As previously mentioned, various embodiments may be implemented, for example, using one or more well-known computer systems, such as computer system 1400 shown in FIG. 14. One or more computer systems 1400 may be used, for example, to implement any of the embodiments discussed herein, as well as combinations and sub-combinations thereof.

Computer system 1400 may include one or more processors (also called central processing units, or CPUs), such as a processor 1404. Processor 1404 may be connected to a communication infrastructure or bus 1406.

Computer system 1400 may also include user input/output device(s) 1403, such as monitors, keyboards, pointing devices, etc., which may communicate with communication infrastructure 1406 through user input/output interface(s) 1402.

One or more of processors 1404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1400 may also include a main or primary memory 1408, such as random access memory (RAM). Main memory 1408 may include one or more levels of cache. Main memory 1408 may have stored therein control logic (i.e., computer software) and/or data.

Computer system 1400 may also include one or more secondary storage devices or memory 1410. Secondary memory 1410 may include, for example, a hard disk drive 1412 or a removable storage device or drive 1414. Removable storage drive 1414 may be a floppy disk drive, a magnetic tape drive, a compact disk drive, an optical storage device, tape backup device, or any other storage device/drive.

Removable storage drive 1414 may interact with a removable storage unit 1418. Removable storage unit 1418 may include a computer usable or readable storage device having stored thereon computer software (control logic) or data. Removable storage unit 1418 may be a floppy disk, magnetic tape, compact disk, DVD, optical storage disk, or any other computer data storage device. Removable storage drive 1414 may read from or write to removable storage unit 1418.

Secondary memory 1410 may include other means, devices, components, instrumentalities, or other approaches for allowing computer programs or other instructions or data to be accessed by computer system 1400. Such means, devices, components, instrumentalities, or other approaches may include, for example, a removable storage unit 1422 and an interface 1420. Examples of the removable storage unit 1422 and the interface 1420 may include a program cartridge and cartridge interface (such as that found in video game devices), a removable memory chip (such as an EPROM or PROM) and associated socket, a memory stick and USB port, a memory card and associated memory card slot, or any other removable storage unit and associated interface.

Computer system 1400 may further include a communication or network interface 1424. Communication interface 1424 may enable computer system 1400 to communicate and interact with any combination of external devices, external networks, external entities, etc. (individually and collectively referenced by reference number 1428). For example, communication interface 1424 may allow computer system 1400 to communicate with external or remote devices 1428 over communications path 1426, which may be wired or wireless (or a combination thereof), and which may include any combination of LANs, WANs, the Internet, etc. Control logic or data may be transmitted to and from computer system 1400 via communication path 1426.

Computer system 1400 may also be any of a personal digital assistant (PDA), desktop workstation, laptop or notebook computer, netbook, tablet, smart phone, smart watch or other wearable, appliance, part of the Internet-of-Things, or embedded system, to name a few non-limiting examples, or any combination thereof.

Computer system 1400 may be a client or server, accessing or hosting any applications or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); or a hybrid model including any combination of the foregoing examples or other services or delivery paradigms.

Any applicable data structures, file formats, and schemas in computer system 1400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1400, main memory 1408, secondary memory 1410, and removable storage units 1418 and 1422, as well as tangible articles of manufacture embodying any combination of the foregoing. Such control logic, when executed by one or more data processing devices (such as computer system 1400), may cause such data processing devices to operate as described herein.

Based on the teachings contained in this disclosure, it will be apparent to persons skilled in the relevant art(s) how to make and use embodiments of this disclosure using data processing devices, computer systems, or computer architectures other than that shown in FIG. 14. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, or entities illustrated in the figures or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an exemplary embodiment," or similar phrases, indicate that the embodiment described can include a particular feature, structure, or characteristic, but every embodiment cannot necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected," along with their derivatives. These terms are not necessarily intended as synonyms for each other. For example, some embodiments can be described using the terms "connected" or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   providing, by a computing device, a graphical user interface (GUI) that provides access to a favorites list from within a global header accessible anywhere in an application, wherein the global header of the GUI contains a favorites icon and the favorites list comprises:
      a list of polymorphic objects across a plurality of different connected applications and having a plurality of object types corresponding to each of the plurality of the different connected applications; and
      a description for each of the list of polymorphic objects describing respective object types;
   displaying, by the computing device, the favorites list of the list of polymorphic objects with the description in the GUI, overlaid on a view of an object, responsive to selection of the favorites list from within the global header;
   adding, by the computing device, the view of the object in the GUI as a favorite to the favorites list by a control within the favorites list; and
   displaying the favorites icon in an active or inactive state based on a determination whether the object is added to the favorites list.

2. The method of claim 1, further comprising:
   disabling addition of the view of the object in the GUI as a favorite based on a type of the object.

3. The method of claim 1, wherein the favorites list, upon selection via the global header, appears in half-sheet view, overlaid on a view of the object in the GUI, wherein the view of the object is masked to prevent user interaction but is visible to allow the user to see the object that can be favorited.

4. The method of claim 3, further comprising:
   enabling, by the computing device, the user to expand the half-sheet view to a full-sheet view and view the entire favorites list, scroll the full-sheet view, or filter the favorites list.

5. The method of claim 1, further comprising:
   enabling, by the computing device, the user to remove from within the favorites list a single favorite item, regardless of object type, using the control within the favorites list.

6. The method of claim 1, further comprising:
   enabling, by the computing device, the user to navigate to objects via the favorites list, from anywhere in the application.

7. The method of claim 1, wherein the display of the favorites list identifies, for the plurality of favorites, a platform on which an object is selectable from within the favorites list for user interaction.

8. A system, comprising:
   a memory; and
   at least one processor coupled to the memory, wherein the at least one processor is configured to:
      provide a graphical user interface (GUI) that provides access to a favorites list from within a global header accessible anywhere in an application, wherein the global header of the GUI contains a favorites icon and the favorites list comprises:
         a list of polymorphic objects across a plurality of different connected applications and having a plurality of object types corresponding to each of the plurality of the different connected applications; and
         a description for each of the list of polymorphic objects describing respective object types;
      display the favorites list of the list of polymorphic objects with the description in the GUI, overlaid on a view of an object, responsive to selection of the favorites list from within the global header;
      add the view of the object in the GUI as a favorite to the favorites list by a control within the favorites list; and
      displaying the favorites icon in an active or inactive state based on a determination whether the object is added to the favorites list.

9. The system of claim 8, wherein the at least one processor is further configured to:
   disabling addition of the view of the object in the GUI as a favorite based on a type of the object.

10. The system of claim 8, wherein the favorites list, upon selection via the global header, appears in half-sheet view, overlaid on a view of the object in the GUI, wherein the view of the object is masked to prevent user interaction but is visible to allow the user to see the object that can be favorited.

11. The system of claim 10, wherein the at least one processor is further configured to:
    enable, by the computing device, the user to expand the half-sheet view to a full-sheet view and view the entire favorites list, scroll the full-sheet view, or filter the favorites list.

12. The system of claim 8, wherein the at least one processor is further configured to:
    enable, by the computing device, the user to remove from within the favorites list a single favorite item, regardless of object type, using the control within the favorites list.

13. The system of claim 8, wherein the at least one processor is further configured to:
    enable, by the computing device, the user to navigate to objects via the favorites list, from anywhere in the application.

14. The system of claim 8, wherein the display of the favorites list identifies, for the plurality of favorites, a platform on which an object is selectable from within the favorites list for user interaction.

15. A non-transitory computer-readable device having instructions stored thereon that, when executed by a computing device, causes the computing device to perform the operations comprising:
  providing, by the computing device, a graphical user interface (GUI) that provides access to a favorites list from within a global header accessible anywhere in an application, wherein the global header of the GUI contains a favorites icon and the favorites list comprises:
    a list of polymorphic objects across a plurality of different connected applications and having a plurality of object types corresponding to each of the plurality of the different connected applications; and
    a description for each of the list of polymorphic objects describing respective object types;
  displaying, by the computing device, the favorites list of the list of polymorphic objects with the description in the GUI, overlaid on a view of an object, responsive to selection of the favorites list from within the global header;
  adding, by the computing device, the view of the object in the GUI as a favorite to the favorites list by a control within the favorites list; and
  displaying the favorites icon in an active or inactive state based on a determination whether the object is added to the favorites list.

16. The non-transitory computer-readable device of claim 15, the operations performed by the computing device further comprising:
  disabling addition of the view of the object in the GUI as a favorite based on a type of the object.

17. The non-transitory computer-readable device of claim 15, wherein the favorites list, upon selection via the global header, appears in half-sheet view, overlaid on a view of the object in the GUI, wherein the view of the object is masked to prevent user interaction but is visible to allow the user to see the object that can be favorited.

18. The non-transitory computer-readable device of claim 17, the operations performed by the computing device further comprising:
  enabling, by the computing device, the user to expand the half-sheet view to a full-sheet view and view the entire favorites list, scroll the full-sheet view, or filter the favorites list.

19. The non-transitory computer-readable device of claim 15, the operations performed by the computing device further comprising:
  enabling, by the computing device, the user to remove from within the favorites list a single favorite item, regardless of object type, using the control within the favorites list.

20. The non-transitory computer-readable device of claim 15, the operations performed by the computing device further comprising:
  enabling, by the computing device, the user to navigate to objects via the favorites list, from anywhere in the application.

21. The non-transitory computer-readable device of claim 15, wherein the display of the favorites list identifies, for the plurality of favorites, a platform on which an object is selectable from within the favorites list for user interaction.

* * * * *